US012647039B2

(12) United States Patent
Zou et al.

(10) Patent No.: US 12,647,039 B2
(45) Date of Patent: Jun. 2, 2026

(54) SWITCHING POWER SUPPLY AND CONTROL METHOD THEREOF

(71) Applicants: Diodes Incorporated, Plano, TX (US); BCD SHANGHAI MICRO-ELECTRONICS COMPANY LIMITED, Shanghai (CN)

(72) Inventors: Cong Zou, Shanghai (CN); Sen Dou, Shanghai (CN); Shaohua Peng, Shanghai (CN)

(73) Assignees: Diodes Incorporated, Plano, TX (US); BCD Shanghai Micro-Electronics Company Limited, Shanghai (CN)

( * ) Notice: Subject to any disclaimer, the term of this patent is extended or adjusted under 35 U.S.C. 154(b) by 214 days.

(21) Appl. No.: 18/406,621

(22) Filed: Jan. 8, 2024

(65) Prior Publication Data

US 2025/0030350 A1     Jan. 23, 2025

Related U.S. Application Data

(63) Continuation of application No. PCT/CN2023/119614, filed on Sep. 19, 2023.

(30) Foreign Application Priority Data

Jul. 21, 2023     (CN) .......................... 202310904247.5

(51) Int. Cl.
| | |
|---|---|
| *H02M 3/335* | (2006.01) |
| *H02M 1/088* | (2006.01) |
| *H02M 1/36* | (2007.01) |

(52) U.S. Cl.
CPC ....... *H02M 3/33592* (2013.01); *H02M 1/088* (2013.01); *H02M 1/36* (2013.01); *H02M 3/33523* (2013.01)

(58) Field of Classification Search
CPC ........... H02M 3/22; H02M 1/08; H02M 1/36; H02M 3/24; H02M 3/325; H02M 3/335;
(Continued)

(56) References Cited

U.S. PATENT DOCUMENTS

| | | | |
|---|---|---|---|
| 5,930,660 A | 7/1999 | Davis | |
| 8,704,270 B2 | 4/2014 | Menard et al. | |

(Continued)

FOREIGN PATENT DOCUMENTS

| | | |
|---|---|---|
| JP | H06196705 A | 7/1994 |
| KR | 20050012175 A | 1/2005 |

(Continued)

OTHER PUBLICATIONS

Office Action for Korean Patent Application No. 10-2022-0189391, mailed Jun. 22, 2024, 19 pages.
(Continued)

*Primary Examiner* — Jeffrey A Gblende
(74) *Attorney, Agent, or Firm* — AP3 Law Firm PLLC

(57) ABSTRACT

A switching power supply includes a secondary control circuit coupled to a secondary side of a transformer of the switching power supply, and a primary control circuit coupled to a primary side of the transformer. The secondary control circuit is configured to receive a power request signal of a load device, and encode the power request signal to generate encoded information. The primary control circuit is configured to receive, by use of the transformer, a feedback signal reflecting an output voltage of the switching power supply, decode the encoded information based on a change of the feedback signal, and based thereon, control the switching power supply to supply power to the load device.

23 Claims, 6 Drawing Sheets

100

(58) Field of Classification Search

CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| 10,230,303 | B2 * | 3/2019 | Malinin | H02M 1/32 |
|---|---|---|---|---|
| 10,326,371 | B2 * | 6/2019 | Chung | H02M 3/33507 |
| 2002/0074562 | A1 | 6/2002 | Suzuki et al. | |
| 2005/0017290 | A1 | 1/2005 | Takahashi et al. | |
| 2009/0020765 | A1 | 1/2009 | Miura | |
| 2014/0160810 | A1 * | 6/2014 | Zheng | H02M 3/33576 |
| | | | | 363/21.17 |
| 2014/0332841 | A1 | 11/2014 | Veeramma | |
| 2014/0353851 | A1 | 12/2014 | Muyari et al. | |
| 2020/0083321 | A1 | 3/2020 | Ogasawara et al. | |
| 2020/0111903 | A1 | 4/2020 | Joo | |
| 2021/0074849 | A1 | 3/2021 | Kinoshita | |
| 2023/0238430 | A1 | 7/2023 | Long et al. | |

FOREIGN PATENT DOCUMENTS

| KR | 20210158797 | A | 12/2021 |
|---|---|---|---|
| TW | 396505 | B | 7/2000 |
| TW | 201338184 | A | 9/2013 |

OTHER PUBLICATIONS

Office Action for Taiwan Application No. 111115745, mailed Mar. 8, 2023, 7 Pages.

* cited by examiner

100

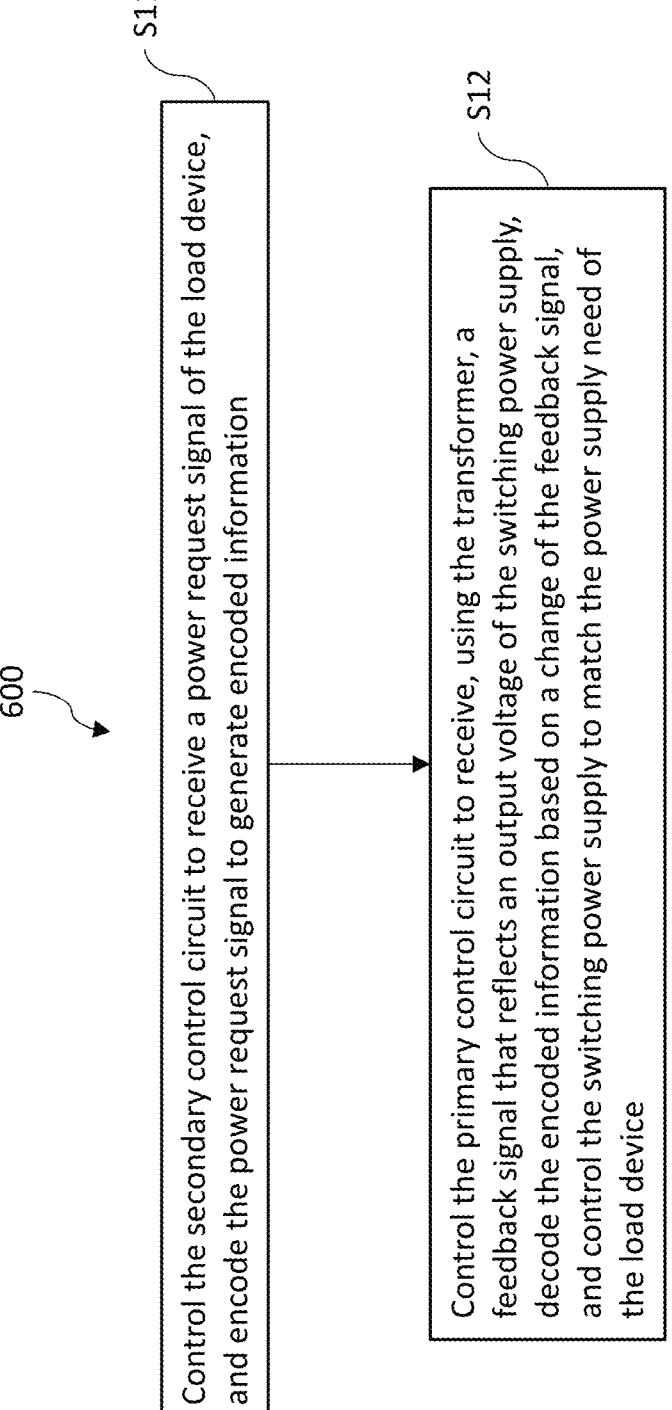

600

S11

Control the secondary control circuit to receive a power request signal of the load device, and encode the power request signal to generate encoded information

S12

Control the primary control circuit to receive, using the transformer, a feedback signal that reflects an output voltage of the switching power supply, decode the encoded information based on a change of the feedback signal, and control the switching power supply to match the power supply need of the load device

FIG. 6

SWITCHING POWER SUPPLY AND CONTROL METHOD THEREOF

CROSS-REFERENCE TO RELATED APPLICATIONS

This patent application is a continuation of International Application No. PCT/CN2023/119614, filed on Sep. 19, 2023 and entitled "Switching power supply and control method thereof," which claims priority to Chinese Patent Application No. 202310904247.5, filed on Jul. 21, 2023 and entitled "Switching power supply and control method thereof." The aforementioned applications are hereby incorporated by reference herein as if reproduced in their entireties.

TECHNICAL FIELD

The present disclosure relates generally to the field of integrated circuits and power supplies, and in particular embodiments, to techniques and mechanisms for a switching power supply and a control method thereof.

BACKGROUND

In existing fast charging solutions, a primary control chip adjusts information of a switching power supply, such as the output voltage, current, and so on, in real time through an optocoupler device, according to voltage or current request information that is requested by a device to be charged (e.g., a mobile terminal device) and received by a secondary control chip, such that the request information of the terminal device is fed back from the secondary side to the primary side.

Consumer electronics using the existing fast charging solutions are in great demand, which leads to large scale production of optocoupler devices, and are thus more susceptible to interference from critical parameters of the optocoupler devices. Due to changes of the system signal processing circuit design, technological process problems or environment, parameters of optocoupler devices may drift, and it is possible that the request information received by the primary control chip is incomplete or the request information is even unable to be received by the primary control chip, which causes the information to be invalid and affects charging of devices to be charged. In addition, the addition of an optocoupler device also increases the system cost.

Therefore, how to reduce the system cost and avoid the primary control chip from receiving incomplete information or not receiving information is a problem to be solved.

SUMMARY

Technical advantages are generally achieved, by embodiments of this disclosure which describe a switching power supply and a control method thereof.

An objective of the present disclosure is to provide a switching power supply and a control method of the switching power supply, to solve technical problems where existing switching power supplies including optocoupler devices increase system cost, and a primary control chip receives incomplete information or cannot receive information.

In order to solve the technical problems above, embodiments of the present disclosure provide a switching power supply for supplying power to a load device, including: a secondary control circuit coupled to a secondary side of a transformer of the switching power supply, the secondary control circuit being configured to receive a power request signal of the load device, and encode the power request signal to generate coded information; and a primary control circuit configured to: use the transformer to receive a feedback signal reflecting an output voltage of the switching power supply, decode the encoded information based on a change of the feedback signal, and control the switching power supply to match a power supply demand of the load device.

Optionally, a process of determining the change of the feedback signal includes: the primary control circuit uses the transformer to receive a width value of the feedback signal that is in the present control cycle and that corresponds to the secondary control circuit during on-time; obtain a width value of the feedback signal in a previous control cycle, wherein the width value of the feedback signal in the previous control cycle is stored in the primary control circuit; and determine the change of the feedback signal according to a relationship between a threshold value and a difference between the width values of the feedback signals in the present control cycle and the previous control cycle.

Optionally, the primary control circuit decoding the encoded information based on the change of the feedback signal, including: when the difference obtained is greater than the threshold value, the primary control circuit decodes the encoded information sent by the secondary control circuit to obtain a first level signal; when the difference value obtained is less than or equal to the threshold value, the primary control circuit decodes the encoded information sent by the secondary control circuit to obtain a second level signal.

Optionally, a process of determining the change of the feedback signal includes: the primary control circuit uses the transformer to receive a width value of the feedback signal that is in the present control cycle and corresponds to the secondary control circuit during on-time; obtain a width value of the feedback signal in a previous control cycle, and primary currents in the present control cycle and the previous control cycle, wherein the width value of the feedback signal in the previous control cycle is stored in the primary control circuit; and determine the change of the feedback signal according to a relationship between a ratio of the primary current in the present control cycle to the width value of the feedback signal and a ratio of the primary current to the width value of the feedback signal in the previous control cycle.

Optionally, the primary control circuit decodes the encoded information based on the change of in the feedback signal, including: when the ratio corresponding to the present control cycle is smaller than the ratio corresponding to the previous control cycle, the primary control circuit decodes the encoded information sent by the secondary control circuit to obtain a first level signal; and when the ratio corresponding to the present control cycle is equal to the ratio corresponding to the previous control cycle, the primary control circuit decodes the encoded information sent by the secondary control circuit to obtain a second level signal.

Optionally, the secondary control circuit includes a synchronous rectifier metal-oxide-semiconductor field-effect transistor (MOSFET), and a process of determining the encoded information includes: when receiving the power request signal of the load device, the secondary control circuit controls the synchronous rectifier MOSFET to perform delayed turn-off for a preset time, and encodes the power request signal to obtain the encoded information.

Optionally, the secondary control circuit includes a synchronous rectifier MOSFET, and a process of determining the encoded information includes: when receiving the power request signal of the load device, the secondary control circuit encodes the power request signal to obtain the encoded information during a secondary on-time of the synchronous rectifier MOSFET after the secondary control circuit controls to turn off the synchronous rectifier MOSFET.

Optionally, the secondary control circuit includes a secondary side detection circuit, and a process of determining the secondary on-time of the synchronous rectifier MOSFET includes: the secondary side detection circuit is used to detect a first moment when an output voltage signal of the secondary control circuit starts changing from a low-level signal state, at a second moment when the output voltage signal of the secondary control circuit increases to reach a high-level signal state, start timing and control the synchronous rectifier MOSFET to turn on for a second time, and detect a third moment when the output voltage signal of the secondary control circuit drops to a low-level state after the synchronous rectifier MOSFET is turned on for the second time, wherein a time interval between the second moment and the third moment is used as the secondary on-time.

Optionally, the primary control circuit includes a primary side detection circuit, and a process of determining the change of the feedback signal includes: the primary side detection circuit is used to detect a moment when the feedback signal drops and is lower than a reference value, and obtain a relationship between a present feedback signal and the reference value within a specified time to determine the change of the present feedback signal.

Optionally, the primary control circuit decodes the encoded information based on the change of the feedback signal, including: when detecting within the specified time that the present feedback signal exceeds the reference value again, the primary control circuit decodes the encoded information sent by the secondary control circuit to obtain a first level signal; when detecting within the specified time that the present feedback signal does not exceed the reference value again, the primary control circuit decodes the encoded information sent by the secondary control circuit to obtain a second level signal.

Optionally, the secondary control circuit and the primary control circuit respectively use a multiplexed PIN, and change a resistance value of a resistor connected to the multiplexed PIN to determine the specified time, wherein there is a mapping relationship between a resistance change of the resistor connected to the multiplexed PIN and a change of the specified time.

Optionally, the secondary control circuit further includes a voltage detection circuit, wherein the voltage detection circuit is used to obtain a corresponding voltage change based on a current value of a VCC PIN of the secondary control circuit, and the voltage change indicating the resistance change of the resistor.

In order to solve the above technical problems, embodiments of the present disclosure also provide a method of control a switching power supply. The switching power supply is used to supply power to a load device, and includes a secondary control circuit and a primary control circuit. The secondary control circuit is coupled to the secondary side of a transformer of the switching power supply. The method includes: controlling the secondary control circuit to receive a power request signal of the load device, and encoding the power request signal to generate encoded information; and controlling the primary control circuit to receive, using the transformer, a feedback signal that reflects an output voltage of the switching power supply, decoding the encoded information based on a change of the feedback signal, and controlling the switching power supply to match the power supply need of the load device.

Optionally, a process of determining the change of the feedback signal includes: receiving, by use of the transformer, a width value of the feedback signal in the present control cycle corresponding to the secondary control circuit during on-time; obtaining a width value of the feedback signal in a previous control cycle, wherein the width value of the feedback signal in the previous control cycle is stored in the primary control circuit; and based on a relationship between a threshold value and a difference of width values of the feedback signal in the present control cycle and the previous control cycle, determining the change of the feedback signal.

Optionally, decoding the encoded information based on the change of the feedback signal includes: when the difference obtained is greater than the threshold value, decoding the encoded information sent by the secondary control circuit to obtain a first level signal; when the difference obtained is less than or equal to the threshold, decoding the encoded information sent by the secondary control circuit to obtain a second level signal.

Optionally, a process of determining the change of the feedback signal includes: receiving, using the transformer, a width value of the feedback signal that is in the present control cycle and that corresponds to the secondary control circuit during on-time; obtaining a width value of the feedback signal in a previous control cycle, primary currents of the present control cycle and the previous control cycle, wherein the width value of the feedback signal in the previous control cycle is stored in the primary control circuit; and determining the change of the feedback signal based on a relationship between a ratio of the primary current to the width value of the feedback signal in the present control cycle and a ratio of the primary current to the width of the feedback signal in the previous control cycle.

Optionally, decoding the encoded information based on the change of the feedback signal includes: when the obtained ratio corresponding to the present control cycle is smaller than the ratio corresponding to the previous control cycle, decoding the encoded information sent by the secondary control circuit to obtain a first level signal; and when the obtained ratio corresponding to the present control cycle is equal to the ratio corresponding to the previous control cycle, decoding the encoded information sent by the secondary control circuit to obtain a second level signal.

Optionally, the secondary control circuit includes a synchronous rectifier MOSFET, and the process of determining the change of the feedback signal includes: when receiving the power request signal of the load device, controlling to delay turning off the synchronous rectifier MOSFET by a preset time, and encoding the power request signal to obtain the encoded information.

Optionally, the secondary control circuit includes a synchronous rectifier MOSFET, and the process of determining the change of the feedback signal includes: when receiving the power request signal of the load device, controlling to turn off the synchronous rectifier MOSFET, and encoding the power request signal to obtain the encoded information during a secondary on-time after the synchronous rectifier MOSFET is turned off.

Optionally, the secondary control circuit includes a secondary detection circuit, and a process for determining the secondary on-time of the synchronous rectifier MOSFET includes: detecting a first moment when an output voltage signal of the secondary control circuit starts changing from a low-level signal state, at a second moment when the output voltage signal of the secondary control circuit increases to reach a high-level signal state, starting timing and controlling the synchronous rectifier MOSFET to turn on for a second time, and detecting a third moment when the output voltage signal of the secondary control circuit drops to a low-level state after the synchronous rectifier MOSFET is turned on for the second time, wherein the time interval between the second moment and the third moment is used as the secondary on-time.

Optionally, the primary control circuit includes a primary detection circuit, and the process of determining the change of the feedback signal includes: starting from a moment when detecting that the feedback signal drops and is lower than a reference value, obtaining a relationship between a present feedback signal and a reference value within a specified time to determine the change of the present feedback signal.

Optionally, decoding the encoded information based on the change of the feedback signal includes: when detecting, within the specified time, that the present feedback signal exceeds the reference value again, encoding the encoded information sent by the secondary control circuit to obtain a first level signal; and when detecting, within the specified time, that the present feedback signal does not exceed the reference value again, encoding the encoded information sent by the secondary control circuit to obtain a second level signal.

Optionally, the specified time is determined by using multiplexed PINs corresponding to the secondary control circuit and the primary control circuit, and by changing resistance values of resistors connected to the multiplexed PINs, wherein there is a mapping relationship between resistance changes of the resistors connected to the multiplexed PINs and changes of the specified time.

Optionally, the secondary control circuit further includes a voltage detection circuit configured to obtain a change of a corresponding voltage value by detecting a current through a VCC PIN of the secondary control circuit, wherein a change of the voltage value indicates a resistance change of a resistor.

Optionally, after using the transformer to receive the feedback signal, the method further includes: presetting a start bit and a stop check bit corresponding to the encoded information; and decoding the encoded information to obtain decoded information based on the change of the feedback signal, the start bit and the stop check bit.

Embodiments of the present disclosure provide a switching power supply for supplying power to a load device. The switching power supply includes a secondary control circuit coupled to the secondary side of a transformer of the switching power supply. The secondary control circuit is configured for receiving a power request signal of the load device, and encoding the power request signal to generate encoded information. The switching power supply includes a primary control circuit, which is configured to use the transformer to receive a feedback signal that reflects an output voltage of the switching power supply, decode the encoded information based on a change of the feedback signal, and control the switching power supply to match the power supply need of the load device. The embodiment switching power supply performs transmission through the transformer without the need of using an optocoupler device for transmission, and avoids the situation where the request information received by the primary control chip is invalid or incomplete, which is caused by drifting of optocoupler device parameters due to changes in a signal processing circuit, technological process or environment. This improves the code transmission success rate of the primary control circuit and reduces the cost of the entire system. Further, the primary control circuit utilizes the transformer to receive the feedback signal, and decodes the encoded information merely based on the change of the feedback signal so as to match the power supply need of the load device, which simplifies the decoding operation process.

In addition, embodiments of the present disclosure also provide a control method for a switching power supply, which has the same beneficial effects as the above-mentioned switching power supply.

In accordance with one aspect of the present disclosure, a switching power supply is provided that includes: a secondary control circuit coupled to a secondary side of a transformer of the switching power supply, the secondary control circuit being configured to receive a power request signal of a load device, and encode the power request signal to generate encoded information; and a primary control circuit coupled to a primary side of the transformer, the primary control circuit being configured to: receive, by use of the transformer, a feedback signal reflecting an output voltage of the switching power supply, decode the encoded information based on a change of the feedback signal, and based thereon, control the switching power supply to supply power to the load device.

In accordance with another aspect of the present disclosure, a method is provided that includes: receiving, at a secondary control circuit of a switching power supply, a power request signal of a load device of the switching power supply, the switching power supply comprising the secondary control circuit and a primary control circuit that are coupled, respectively, to a secondary side and a primary side of a transformer of the switching power supply; encoding, at the secondary control circuit, the power request signal to generate encoded information; receiving, at the primary control circuit using the transformer, a feedback signal that reflects an output voltage of the switching power supply; decoding, at the primary control circuit, the encoded information based on a change of the feedback signal; and supplying, by the switching power supply, power to the load device based on the decoding.

In accordance with another aspect of the present disclosure, a switching power supply is provided that includes: a secondary control circuit coupled to a secondary winding of a transformer of the switching power supply, the secondary control circuit comprising a synchronous rectifier switch connected to the secondary winding, and the secondary control circuit being configured to: receive a power request signal from a load device, and encode the power request signal to generate encoded information by controlling an on-time of the synchronous rectifier switch; and a primary control circuit coupled to a primary winding and an auxiliary winding of the transformer, the primary control circuit being configured to: receive, by use of the transformer, a feedback signal related to an output voltage of the switching power supply, decode the encoded information based on a parameter of the feedback signal and a threshold to obtain decoded information, and determine to supply power to the load device based on the decoded information.

BRIEF DESCRIPTION OF THE DRAWINGS

In order to more clearly illustrate embodiments of the present disclosure, drawings in the embodiments of the present disclosure are briefly described in the following. Obviously, the drawings in the following description are only some embodiments of the application, and those of ordinary skill in the art may also obtain other drawings based on these drawings without making creative efforts.

For a more complete understanding of the present disclosure, and the advantages thereof, reference is now made to the following descriptions taken in conjunction with the accompanying drawings, in which:

FIG. 6 is a flowchart of a method for controlling a switch power supply according to embodiments of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create alternative embodiments not explicitly described, and features suitable for such combinations are understood within the scope of this disclosure. It is therefore intended that the appended claims encompass any such modifications or embodiments.

In the following, the technical solutions of embodiments of the present disclosure will be clearly and completely described with reference to the drawings of the embodiments of the present disclosure. Obviously, the described embodiments are some embodiments of the present disclosure, rather than all embodiments. Based on the embodiments of the present disclosure, all other embodiments obtained by those of ordinary skill in the art without creative efforts fall within the protection scope of the present disclosure.

Embodiments of the present disclosure provide a switching power supply and a control method of the switching power supply, to solve the technical problems where the existing switching power supplies including optocoupler devices increase system cost, and information received by a primary control chip is incomplete or information cannot be received by the primary control chip.

In order for those ordinarily skilled in the art to better understand the solutions of the present disclosure, aspects of the present disclosure will be further described in detail below in conjunction with the accompanying drawings and specific embodiments.

Figure 1:
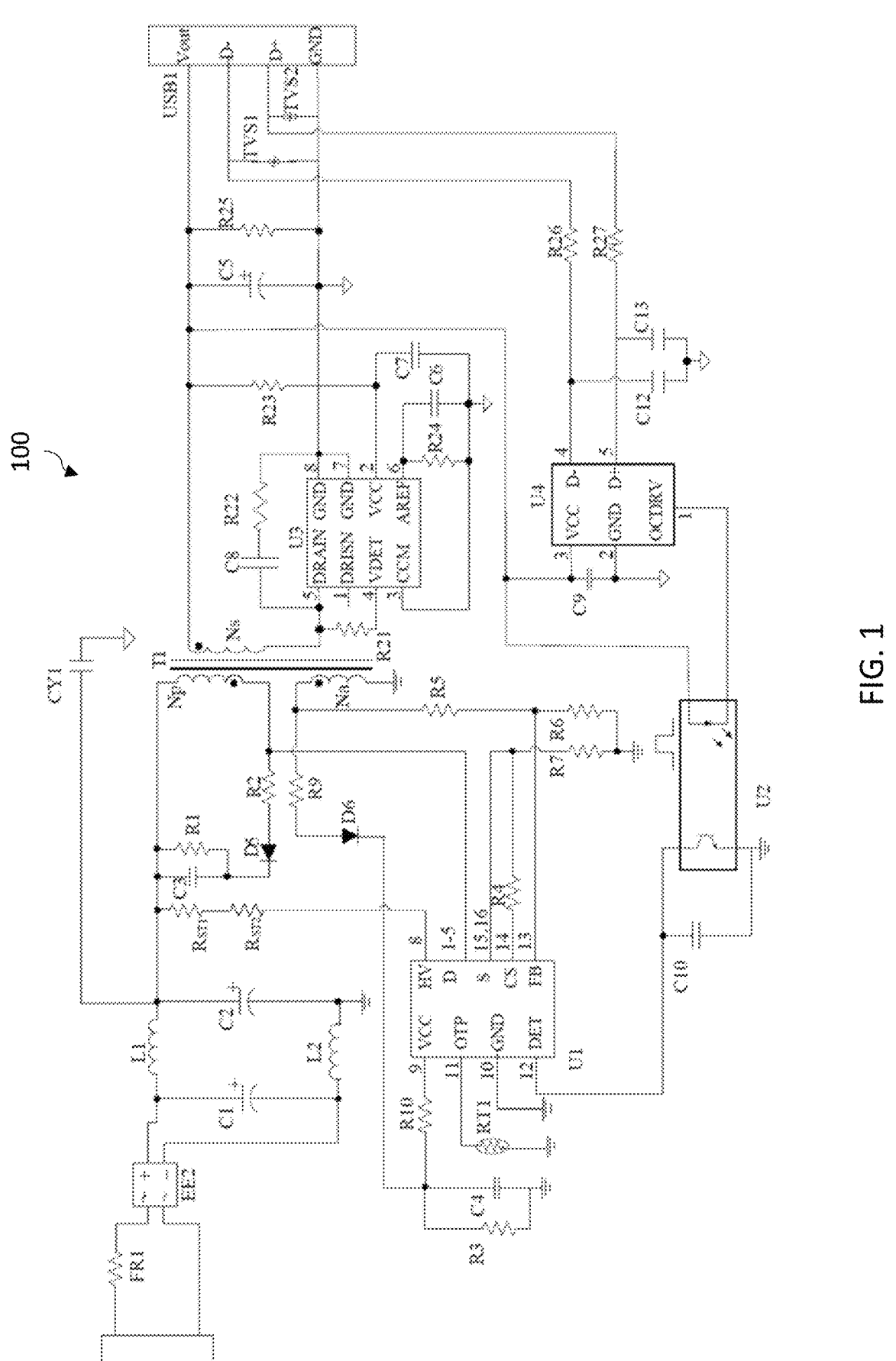
FIG. 1 is a schematic structural diagram of an example existing switching power supply.

FIG. 1 is a schematic structural diagram of an existing switching power supply 100. The switching power supply 100 uses an optocoupler device U2, which is very susceptible to factors such as temperature and so on. When a critical parameter of the optocoupler device U2 is exceeded, it is possible that request information received by a primary control chip U1 may be incomplete or the request information may even not be received.

Figure 2:
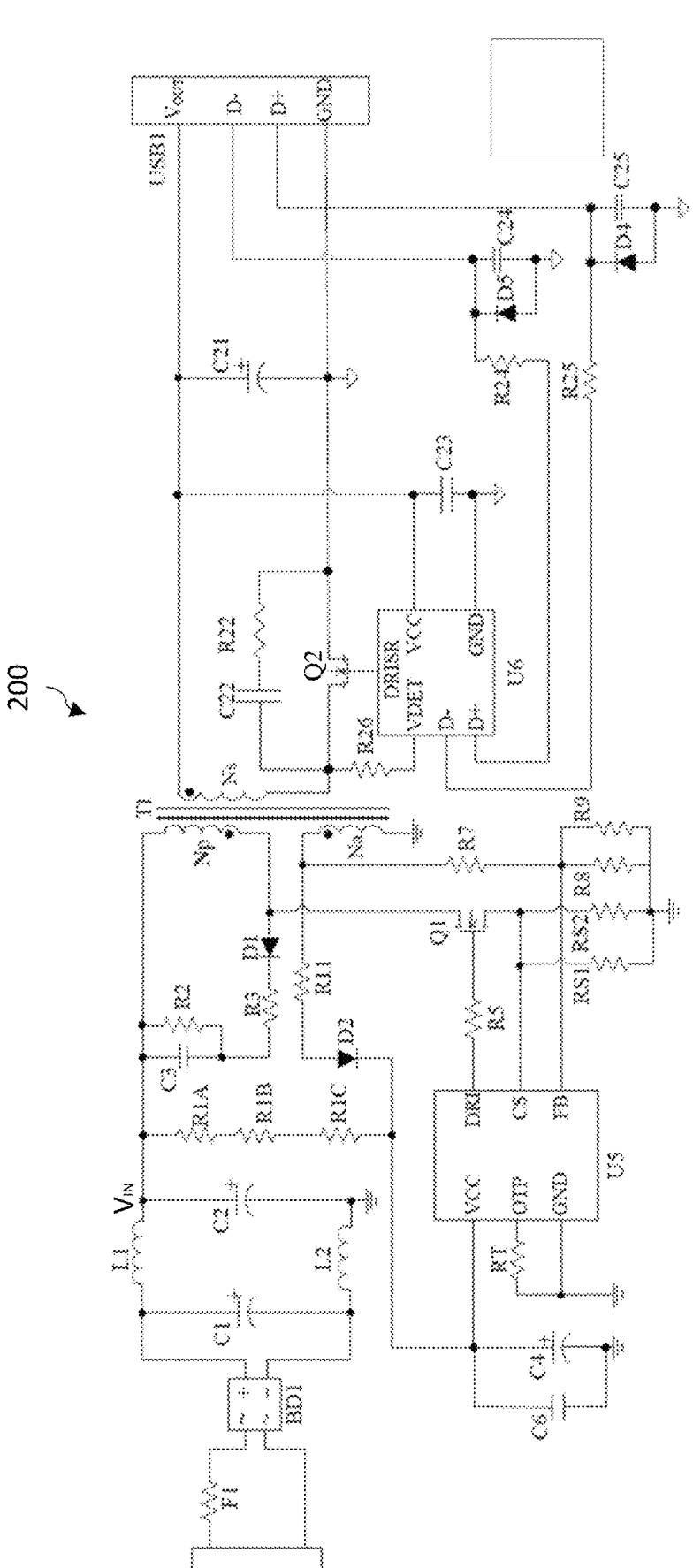
FIG. 2 is a schematic structural diagram of an example switching power supply according to embodiments of the present disclosure.

FIG. 2 is a schematic structural diagram of an example switching power supply 200 according to embodiments of the present disclosure. As shown in FIG. 2, the switching power supply 200 is configured to supply power to a load device. A secondary control circuit is coupled to the secondary side of a transformer (T1) of the switching power supply 200. The secondary control circuit is configured to receive a power request signal from the load device, and to encode the power request signal to generate encoded information. For example, the power request signal may be received via pins D− and D+ of the control chip U6. The power request signal may be used by the load device to request power to be supplied by the switching power supply.

A primary control circuit is coupled to the primary side of the transformer. The primary control circuit may be configured to receive a feedback signal that reflects an output voltage $V_{OUT}$ of the switching power supply 200, decode the encoded information based on a change of the feedback signal, and control the switching power supply 200 to match the power supply need of the load device.

It should be noted that FIG. 2 is only an embodiment of one type of switching power supply, and is used to illustrate the working principle between the secondary control circuit and the primary control circuit of an embodiment switching power supply of the present disclosure. The switching power supply 200 may also have other structures as long as the structures utilize a transformer instead of an optocoupler device for signal transmission, and include a secondary control circuit and a primary control circuit. As shown in FIG. 2, the switching power supply 200 includes a filter, a rectifier bridge BD1, input capacitors C1 and C2, a control chip U5 of the primary control circuit, a primary current sampling resistor R1 (including RIA, RIB and RIC), a secondary synchronous rectifier switch Q2, a control chip U6 of the secondary control circuit, a USB interface, a transformer T1 (including a primary winding Np, a secondary winding Ns and an auxiliary winding Na), and an output capacitor C21. The secondary synchronous rectifier switch Q2 may be a metal-oxide-semiconductor field-effect transistor (MOSFET), a double-diffused MOSFET (DMOSFET), an insulated-gate bipolar transistor (IGBT), a junction gate field-effect transistor (JFET), or any other transistor applicable. The following uses a synchronous rectifier MOSFET Q2 as an example.

The control chip U5 of the primary control circuit is located at the primary side of the transformer of the switching power supply 200. The control chip U5 is configured to control turning on or off a first power switch Q1, and transmit energy to the control chip U6 of the secondary control circuit through the transformer T1. The control chip U6 of the secondary control circuit is connected to the load device, and the secondary control circuit is coupled to the secondary side of the transformer of the switching power supply 200. The secondary control circuit is configured to receive the power request signal from the load device. When the power request signal is obtained or triggered is not limited herein. In one example, the load device may actively provide the power request signal. In another example, the secondary control circuit may receive the power request signal from the load device in real time. If a present signal is different from a signal of a previous cycle, or a specific level signal is received, it is determined that a power request signal is received. The power request signal is encoded at the secondary control circuit to generate the encoded information.

The encoded information, after being generated at the secondary control circuit, may be sent to the primary control circuit through the transformer, that is, the primary control circuit uses the transformer to receive the encoded information. The voltage at the auxiliary winding Na of the transformer T1 is output through a resistor R7 as a feedback signal Vfb (or VFB). The output feedback signal represents the output voltage $V_{OUT}$ of the switching power supply 200, and is used as a feedback control signal and fed to the primary control circuit through the FB pin of the control chip U5 for control. This embodiment decodes the encoded information based on the change of the feedback signal VFB, in order to control the switching power supply 200 to match the power supply needs of the load device, based on decoded information.

It can be understood that in this embodiment, the decoding of the encoded information can be completed based only on a signal parameter of a single feedback signal. Compared with the operation method used in a primary control circuit of an existing switching power supply, where a corresponding detection signal needs to be generated in a specific scenario to decode encoded information, this embodiment does not require a specific scenario. As long as the feedback signal changes, the encoded information can be decoded according to the feedback signal itself, which saves and simplifies the decoding process.

The change of the feedback signal may correspond to a parameter, which may be a value of the width (also referred to as a width value for illustration simplicity) of the feedback signal itself, or the change of the feedback signal may be caused by the width value of the feedback signal and other related parameter(s). These are changes of the feedback signal that may be caused to occur during decoding. Further, the change of the feedback signal may be caused by a combination of the secondary control circuit corresponding to encoding and the primary control circuit corresponding to decoding. The changes of the feedback signal are not limited herein, and can be configured according to the actual applications.

In some embodiment, a parameter of the feedback signal or related to the feedback signal may be configured, and a change of the parameter detected may be used to indicate a change of the feedback signal. When a power request signal is received by the switching power supply, to encode information regarding power demand from the load device, the parameter may be caused to change so as to change the feedback signal. Based on a change of the feedback signal, the encoded information may be decoded correspondingly to generate decoded information. Based on the decoded information, corresponding power demand from the load device may be satisfied/matched by the switching power supply. Embodiments of the present disclosure provide some examples of such parameter for illustration purposes only. Those of ordinary skill in the art would recognize that various parameters of the feedback signal or related to the feedback signal may be used for indicating the change of the feedback signal.

Embodiments of the present disclosure provide a switching power supply for supplying power to a load device. The switching power supply may include a secondary control circuit coupled to the secondary side of a transformer of the switching power supply. The secondary control circuit is configured for receiving a power request signal of the load device, and encoding the power request signal to generate encoded information. The switching power supply may include a primary control circuit, which is configured to use the transformer to receive a feedback signal that reflects the output voltage of the switching power supply, to decode the encoded information based on a change of the feedback signal, and to control the switching power supply to match the power supply need of the load device. The embodiment switching power supply performs transmission through the transformer without the need of using an optocoupler device for transmission, and avoids the situation where the request information received by the primary control chip is invalid or incomplete, which is caused by drifting of optocoupler device parameters due to changes in a signal processing circuit, technological process or environment. The embodiments improve the code transmission success rate of the primary control circuit and reduces the cost of the entire system. Further, the primary control circuit utilizes the transformer to receive the feedback signal, and decodes the encoded information merely based on changes of the feedback signal so as to match the power supply request/need from the load device, which simplifies the decoding operation process.

Based on the above described embodiments, in an embodiment, a process where the primary control circuit corresponding to decoding determines, based on the feedback signal itself, that a change has occurred to the feedback signal includes: receiving, by the primary control circuit using the transformer, a width value of the feedback signal that is in the present control cycle and that corresponds to the secondary control circuit during an on-time of the secondary control circuit; obtaining a width value of the feedback signal in a previous control cycle, where the width value of the feedback signal in the previous control cycle is stored in the primary control circuit; and determining whether a change of the feedback signal in the present cycle based on the relationship of a threshold value and a difference between the width values of the feedback signal in the present control cycle and the previous control cycle. As used herein, the feedback signal in the present cycle may also be referred to as the present feedback signal, and the feedback signal in the previous cycle may also be referred to as the previous feedback signal.

Specifically, the primary control circuit receives, by use of the transformer, the width value of the feedback signal in the present control cycle and corresponding to the secondary control circuit during the on-time of the secondary control circuit, and obtains the width value of the feedback signal in the previous control cycle. The width value of the feedback signal in the previous control cycle is stored in the primary control circuit. That is, in the present control cycle, the primary control circuit receives, by use of the transformer, the feedback signal when the secondary control circuit is on, i.e., when Q2 is turned on. The width value of the feedback signal corresponds to the on-time of Q2. The feedback signal in the previous control cycle was received similarly in the previous control cycle. When a width value of the feedback signal in a control cycle is received, it is stored in the primary control circuit. Considering that the storage space of the primary control circuit may be limited, the feedback signal of each control cycle may be stored on a rolling basis. For example, only signal parameters of the feedback signal in the previous N control cycles including the latest control cycle may be stored. Other applicable methods for storing the feedback signal parameters may also be used. This is no limited herein, and can be set according to the actual situation.

The width values of the feedback signal in two adjacent control cycles may be compared to determine the difference between the width values. Whether the difference is positive or negative is not limited herein, as long as there is a corresponding difference in the width values of the feedback signal in the two adjacent control cycles. It is noted that since the difference may be in a form of a negative value or a positive value, in some embodiments, an absolute value of the difference may be obtained, and the change of the feedback signal may be determined based on the relationship between the absolute value of the difference and the threshold. In some embodiments, a difference may be obtained by subtracting the width value $W2$ of the previous control cycle from the width value $W1$ of the present control cycle, i.e., $\Delta W = W1 - W2$, and the difference may be used to compare with the threshold. In the following, the difference $\Delta W = W1 - W2$ will be used as an example to determine the change of the feedback signal and for decoding. The threshold may be a number greater than 0.

Based on the above embodiment, in an embodiment, decoding, by the primary control circuit, the encoded information based on the change of the feedback signal may include: when detecting that the difference is greater than the threshold, decoding, by the primary control circuit, the encoded information sent by the secondary control circuit to obtain a first level signal; when detecting that the difference is less than or equal to the threshold, decoding, by the primary control circuit, the encoded information sent by the secondary control circuit to obtain a second level signal.

Specifically, the primary control circuit determines whether the difference is greater than the threshold. If the difference is greater than the threshold, the primary control circuit decodes the encoded information sent by the secondary control circuit to obtain the first level signal. If the difference is less than or equal to the threshold, the primary control circuit decodes the encoded information sent by the secondary control circuit to obtain the second level signal. The first level signal is different from the second level signal. That is, if the width value $W1$ of the present control cycle is greater than the width value $W2$ of the previous cycle by the threshold, the decoding generates the first level signal; if the width value $W1$ of the present control cycle is not greater than the width value $W2$ of the previous cycle by the threshold, the decoding generates the second level signal. In other words, when $W1 > (\text{threshold} + W2)$, the primary control circuit generates the first level signal; otherwise, when $W1 < (\text{threshold} + W2)$, the primary control circuit generates the second level signal. Thus, $(\text{threshold} + W2)$ may also be taken as another threshold or a reference value, e.g., threshold 1, to determine the change of the width value of the feedback signal in the present control cycle.

Figure 3:
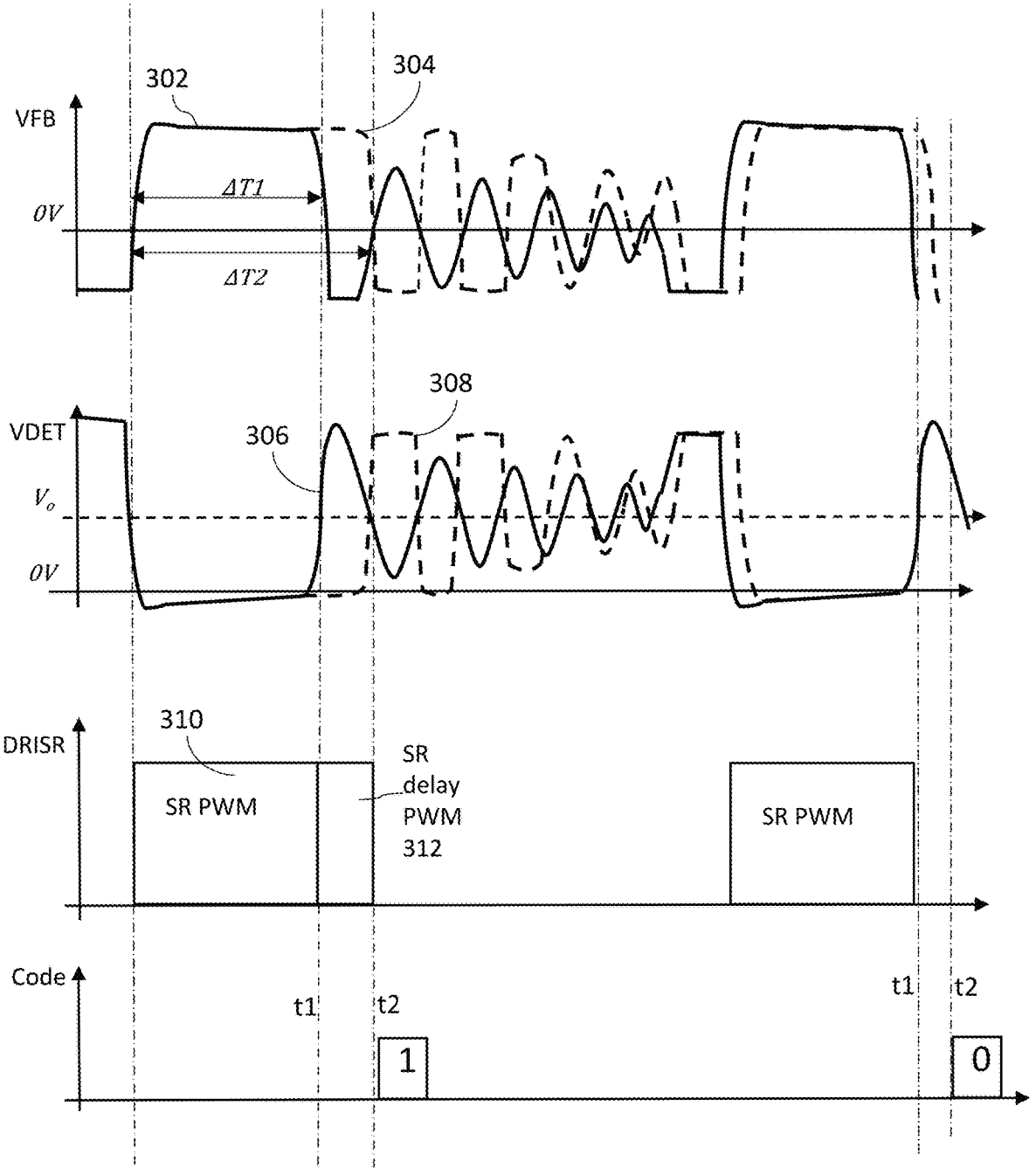
FIG. 3 is a schematic diagram of an example of waveforms of a switching power supply according to embodiments of the present disclosure.
Figure 4:
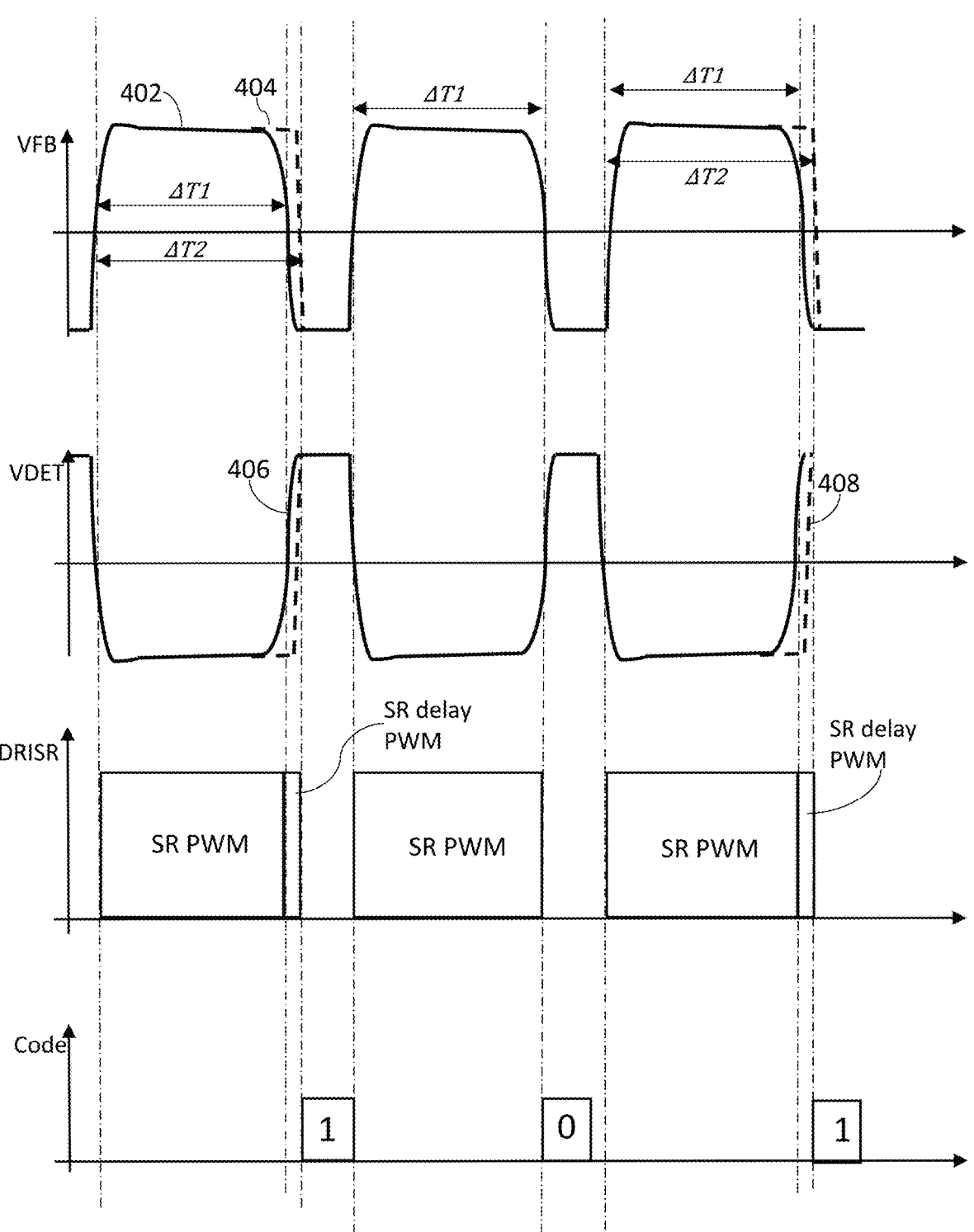
FIG. 4 is a schematic diagram of another example of waveforms of a switching power supply according to embodiments of the present disclosure.

FIG. 3 is a schematic diagram illustrating an example scenario where a ratio of an on-time to a peak current signal changes according to embodiments of the present disclosure. FIG. 4 is schematic diagram illustrating another example scenario where a ratio of an on-time to a peak current signal changes according to embodiments of the present disclosure. FIG. 3 shows a scenario of light load, and FIG. 4 shows a scenario of heavy load. In FIGS. 3 and 4, the solid curves represent operating waveforms of signals under normal operating conditions, and the dashed curves represent operating waveforms of signals after the secondary control circuit sends the encoded information. In the waveforms of each of FIG. 3 and FIG. 4, from top to bottom, the first one is a waveform of a feedback signal at the primary control circuit, the second one is a waveform of a signal at the secondary control circuit, the third one is a waveform of a pulse width modulation (PWM) signal of a switching power supply, and the fourth one is a signal diagram of the switching power supply. The PWM signal may be used to drive Q1 or Q2 to turn on or off.

FIG. 3 and FIG. 4 each show signal waveforms of an embodiment switching power supply under a normal operating condition (i.e., when the secondary side sends the second level signal to the primary side), which is also referred to as case 1 in the following, and in case 2 when the secondary side sends the first level signal to the primary side. The width value of the feedback signal in case 1 corresponds to the PWM pulse width. In particular, FIG. 3 and FIG. 4 each show a waveform of the feedback signal VFB received at the primary control circuit, a waveform of a voltage VDET at the pin of VDET of the secondary control chip U6, a waveform DRISR of the PWM signal of a switching power supply (e.g., the switching power supply 200), i.e., a waveform of a voltage at the pin DRISR of the control chip U6, and a waveform of a code that is decoded from the encoded information. The horizontal axis represents time. The PWM signal is configured to drive the switching power supply to operate in the PWM mode. In FIG. 3, a curve 302 represents the feedback signal in case 1, a curve 304 represents the feedback signal in case 2, a curve 306 represents the voltage VDET in case 1, and a curve 308 represents the voltage VDET in case 2. Similarly, in FIG. 4, a curve 402 represents the feedback signal in case 1, a curve 404 represents the feedback signal in case 2, a curve 406 represents the voltage VDET in case 1, and a curve 408 represents the voltage VDET in case 2.

Under the normal operating condition, i.e., in case 1, the on-time of the width value Tons of the feedback signal is a constant value $\Delta T_1$. The width value Tons of the feedback signal corresponds to an on-time of the secondary control circuit, i.e., the on-time of Q2. The secondary synchronous rectification controller, i.e., the control chip U6, may delay turning off by $\Delta T_{ds}(\Delta T_{ds} = \Delta T_2 - \Delta T_1)$, which causes the on-time to change from being $\Delta T_1$ in the previous control cycle to being an on-time $\Delta T_2$ in the present control cycle. The difference between the on-time of the present cycle and the on-time of the previous control cycle may be compared with a threshold. If the detected difference is greater than the threshold, it is determined that the secondary side sends a logic high signal to the primary side. If the detected difference is less than or equal to the threshold, it is determined that the secondary side sends a logic low signal to the primary side.

As an example, referring to FIG. 3, the feedback signal has a width value $\Delta T_1$ in case 1 as shown by the curve 302, this corresponds to the PWM pulse 310. When the secondary control circuit receives a power request signal and wants to send a logic high signal to the primary side (i.e., case 2) in a control cycle, the secondary control circuit may be delayed to turn off by a preset time, e.g., delayed from t1 to t2 as indicated by the SR delay PWM pulse, to encode the power request signal to generate encoded information. In this case, the width value of the feedback signal may increase to $\Delta T_2$, as shown by the dashed curve 304. When the difference between $\Delta T_2$ and $\Delta T_1$, i.e., $\Delta T_2$-$\Delta T_1$, is greater than a threshold, it is determined that the feedback signal has changed, i.e., the width is larger/increased. Based on the change of the feedback signal, the primary control circuit may decode the encoded information to obtain a high level signal, e.g., 1, as indicated by the waveform of the code. In the next control cycle, the secondary control circuit may want to send a logic low signal to the primary side as an example, and the width value of the feedback signal detected is smaller than the width value of the previous feedback signal (i.e., the secondary control circuit returns to the normal operating condition, and the width value of the feedback signal is about the same as that in case 1), as shown by the curve 304, since the difference of the width values does not exceed the threshold (in this case, the difference is less than 0), the primary control circuit may decode the encoded information to obtain a low level signal, e.g., 0, as indicated by the waveform of the code in the next control cycle. After several codes have been decoded and recorded, the combination of the codes may be compared with preset codes to determine whether the demand for power supply or power change matches a pre-configured power corresponding to the preset codes. If the combination of the codes correspond to the preset codes, the primary side is configured to match the requested power demand.

The threshold may be set based on empirical values, may be a threshold obtained through a large number of experiments, and so on. However, the threshold may have upper and lower limits. The minimum value of the threshold needs to be able to prevent the primary control circuit from mistakenly determining an encoded signal under normal system fluctuations. The maximum value of the threshold needs to be set so that the normal operation of the system is not affected. The threshold may be configured with these two conditions satisfied.

The embodiments of the present disclosure determine the change of the feedback signal based on the relationship between the width values of the feedback signal in two adjacent control cycles and the threshold. The change of the feedback signal is determined based only on the width values of the feedback signal. Thus, the decoding rate is improved and the decoding procedure is simplified.

Based on the above embodiments, in a further embodiment, a process, where the primary control circuit corresponding to decoding determines whether change of the feedback signal based on the width value of the feedback signal and other related parameters, includes: receiving, by the primary control circuit using the transformer, a width value of a feedback signal that is of the present control cycle and corresponds to the secondary control circuit during the on-time of the secondary control circuit; obtaining, by the primary control circuit, a width value of the feedback signal in the previous control cycle, and primary currents in the present control cycle and the previous control cycle, where the width value of the feedback signal in the previous control cycle may be stored in the primary control circuit; and determining the change of the feedback signal based on a relationship of respective ratios of the width values of the feedback signal in the present control cycle and the previous control cycle and the primary currents in the present control cycle and the previous control cycle. In other words, a change of the feedback signal may be determined based on the relationship between a ratio of the width of the feedback signal and the primary current in the present control cycle and a ratio of the width of the feedback signal and the primary current in the previous control cycle.

Specifically, the primary control circuit uses the transformer to receive the width value of the feedback signal that is in the present control cycle and corresponding to the secondary control circuit during the on-time, and at the same time, obtains the stored width value of the feedback signal in the previous control cycle, and obtains the primary currents in the present control cycle and the previous control cycle, respectively. A primary current in this embodiment is the peak current signal in the primary control circuit, i.e., the current flowing through the primary winding Np. Under normal conditions, the ratio of the width of the feedback signal to the primary current corresponding to the on-time is a constant value. That is, during the on-time, the ratio is generally constant. When the secondary synchronous rectification controller sends the codeword information, the width of the feedback signal corresponding to the on-time may be larger.

The change of the feedback signal may be determined based on the ratios of the feedback signal width value and the primary current in two adjacent control cycles. If the ratio of the width value of the feedback signal and the primary current in the present control cycle is the same as the ratio of the width value of the feedback signal and the primary current in the previous control cycle, it is determined that the feedback signal has not changed. If the ratios in the present control cycle and the previous control cycle are different, it is determined that the feedback signal has changed.

The ratio used to determine the change of the feedback signal may be defined as a ratio of the width value of the feedback signal to the primary current, which is referred to as ratio 1, i.e., ratio 1=width value/primary current. The ratio may also be defined as a ratio of the primary current to the width of the feedback signal, which is referred to as ratio 2, i.e., ratio 2=primary current/width value. It is readily known that ratio 1*ratio 2=1. The ratio 2 may be represented using the subsequently provided relationship (1), which will be used as an example in the following for illustration purposes.

An embodiment where the primary control circuit decodes the encoded information based on the change of the feedback signal in the present control cycle may include: when the ratio (ratio 2) corresponding to the present control cycle is smaller than the ratio (ratio 2) corresponding to the previous control cycle, the primary control circuit decodes the encoded information sent by the secondary control circuit to obtain a first level signal; when the ratio 2 corresponding to the present control cycle is equal to the ratio 2 corresponding to the previous control cycle, the primary control circuit decodes the encoded information sent by the secondary control circuit to obtain a second level signal. If the ratio 1 is used, as an example, the primary control circuit may decode the encoded information sent by the secondary control circuit to obtain the first level signal when the ratio 1 corresponding to the present control cycle is greater than the ratio 1 corresponding to the previous control cycle.

Specifically, when the ratio 2 corresponding to the present control cycle that is obtained by the primary control circuit is smaller than the ratio 2 corresponding to the previous control cycle, it means that the ratio 2 of the present control cycle decreases and the on-time is extended (the width value of the feedback signal is increased). The encoded information sent by the secondary control circuit is decoded to obtain the first level signal, and it is determined that the secondary side has sent codeword information 1. When the ratio 2 corresponding to the present control cycle obtained by the primary control circuit obtains is equal to the ratio 2 corresponding to the previous control cycle, the primary control circuit decodes the encoded information sent by the secondary control circuit to obtain the second level signal. The ratio 2 corresponding to the present control cycle remains unchanged, which is indicated/represented using the second level signal. The first level signal and the second level signal are different.

The ratio 2 of the primary current to the width value of the feedback signal may be represented by:

$$\frac{I_{pk}}{T_{ons}} = \frac{n \cdot V_{out}}{L}, \tag{1}$$

where, $I_{pk}$ is the primary current, $T_{ons}$ is the width value of the feedback signal, n is a ratio of the numbers of turns of the transformer between the primary side and the secondary side, $V_{out}$ is the output voltage of the switching power supply, and L is an inductance value of the primary control circuit.

Generally, the parameters on the right side of the above relationship (1) do not change and are constant. If the ratio of the primary current to the width value of the feedback signal decreases to an extent, e.g., reaches a ratio threshold, it means that the secondary control circuit is sending encoded information to the primary control circuit.

This embodiment determines whether the feedback signal has changed based on the ratio of the primary current to the width value of the feedback signal, making the change of the feedback signal authoritative, improving the decoding rate, and simplifying the decoding procedure.

Based on the above embodiments, in a further embodiment, the secondary control circuit may include a synchronous rectifier MOSFET. An example process of determining the encoded information includes: when receiving the power request signal of the load device, the secondary control circuit controls the synchronous rectifier MOSFET to delay turning off for a preset time, to encode the power request signal to obtain the encoded information.

Specifically, referring back to FIG. 2, the synchronous rectifier MOSFET Q2 is connected in parallel with the capacitor C22 and the resistor R22. When receiving the power request signal of the load device, the secondary control circuit controls to delay, for a preset time, to turn off the synchronous rectifier MOSFET Q2. In the above embodiments, the change occurred to the feedback signal is reflected in the decoding; while in the secondary control circuit, it is reflected by controlling the delayed turn-off of the synchronous rectifier MOSFET Q2, which is used to encode the power request signal to obtain the encoded information. At the same time, the delayed turn-off of the synchronous rectifier MOSFET causes the on-time of the feedback signal to change, which in turn causes the feedback signal to change. In this embodiment, the encoded information is decoded according to the change of the feedback signal, so that the power supply need of the load device is matched.

It should be noted that the preset time may be zero (0) or greater than zero (0). When the preset time is 0, it indicates that the synchronous rectifier MOSFET is not presently controlled for delayed turn-off. Configuration of the preset time is not limited, and the specific preset time may be determined according to the actual situation.

In this embodiment, to determine the change of the feedback signal based on the decoding at the primary control circuit, control is needed to delay turning off the synchronous rectifier MOSFET at the secondary control circuit in order to receive the corresponding encoded information, to facilitate the decoding of the encoded information.

The above embodiments determine the change of the feedback signal based only on decoding at the primary control circuit. Another embodiment may combine the secondary control circuit corresponding to encoding and the primary control circuit corresponding to decoding, where the secondary control circuit includes a synchronous rectifier MOSFET, and an example process of determining the encoded information may include: the secondary control circuit encodes the power request signal to obtain the encoded information during the secondary on-time after controlling to turn off the synchronous rectifier MOSFET when the secondary control circuit receives the power request signal of the load device.

Specifically, when the secondary control circuit receives the power request signal of the load device, it may encode the power request signal to obtain the encoded information within the secondary on-time after it controls the synchronous rectifier MOSFET Q2 to turn off. When being turned off abnormally, the synchronous rectifier MOSFET Q2 may be turned on the second time for a period of time after it is turned off. Between the two on-time intervals, the waveform of the feedback signal reflected in the primary control circuit will have a pit. In the above embodiments, the synchronous rectifier MOSFET Q2 of the secondary control circuit is turned off normally. In other examples when the synchronous rectifier MOSFET Q2 is turned off abnormally, the secondary on-time needs also to be considered. This embodiment determines the encoded information in the case where the synchronous rectifier MOSFET Q2 of the secondary control circuit is abnormally turned off.

In this embodiment, the encoded information is determined by the secondary control circuit during the secondary on-time after the secondary control circuit controls to turn off the synchronous rectifier MOSFET Q2. This embodiment takes into account a different aspect, so that the obtained encoded information is relatively comprehensive, which facilitates the subsequent decoding process.

Based on the above embodiments, regarding the determination of the secondary on-time, an embodiment may be provided, where the secondary control circuit includes a secondary detection circuit, and a process for determining the secondary on-time of the synchronous rectifier MOSFET Q2 may include: the secondary detection circuit is configured to detect a first moment when the output voltage signal of the secondary control circuit (e.g., the voltage at the pin VDET of U6) starts changing from a low-level signal state, at a second moment when the output voltage signal of the secondary control circuit increases to reach a high-level signal state, start timing and control the synchronous rectifier MOSFET to turn on for a second time, and detect a third moment when the output voltage signal of the secondary control circuit drops to a low-level state after the synchronous rectifier MOSFET is turned on for the second time. The time interval between the second moment and the third moment is used as the secondary on-time.

Figure 5:
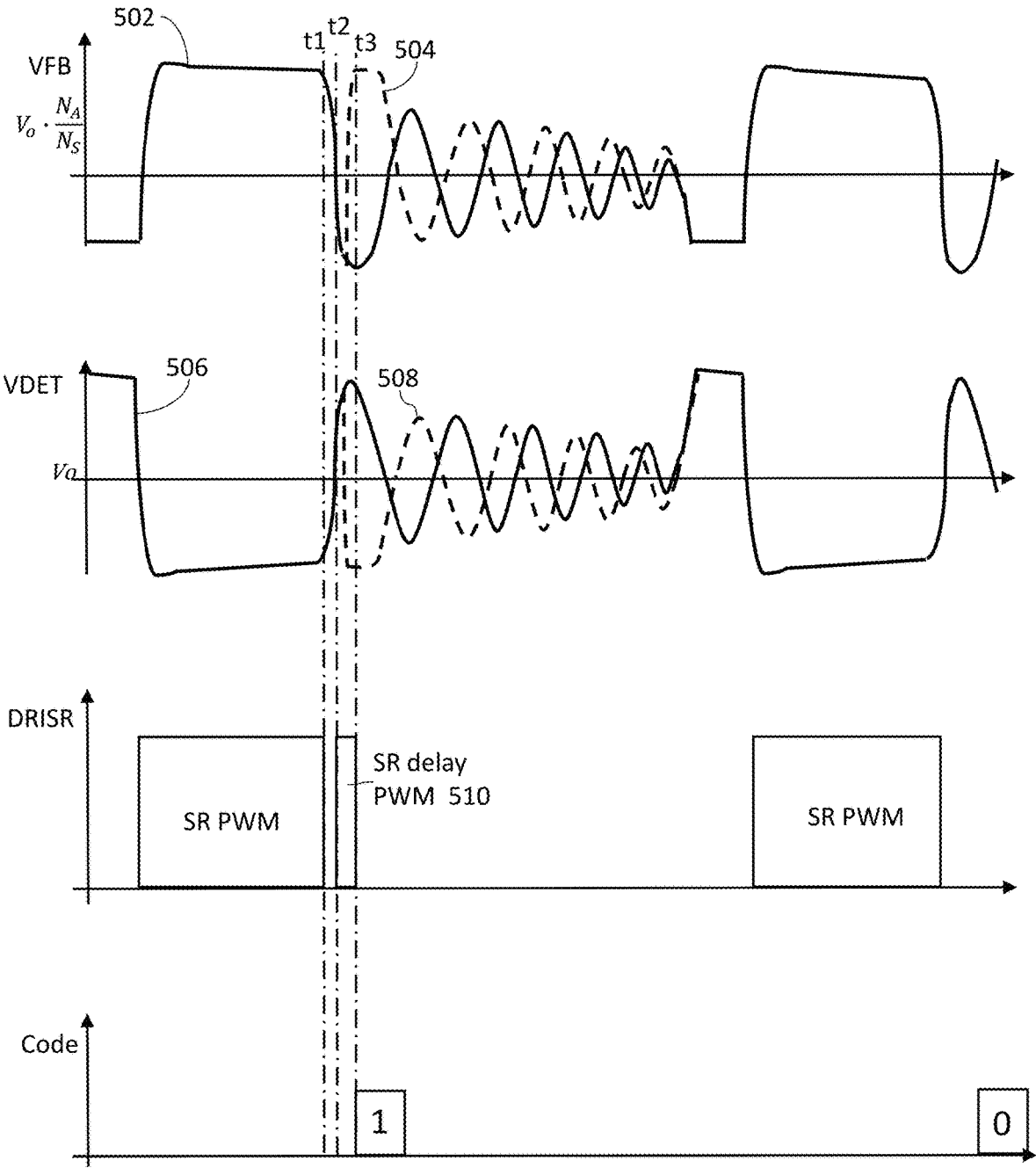
FIG. 5 is a schematic diagram of yet another example of waveforms of a switching power supply according to embodiments of the present disclosure.

FIG. 5 is a schematic diagram showing detection of voltage rising of the feedback signal according embodiments of the present disclosure. As shown in the second waveform diagram (VDET) of FIG. 5, i.e., curve 506, the secondary detection circuit detects that the output voltage signal of the secondary control circuit starts changing from the low-level state at the first moment (i.e., t1), that is, the output voltage signal from the secondary control circuit will gradually change to the high-level state. The secondary detection circuit may start timing at the second moment (t2) when the output voltage signal of the secondary control circuit reaches the high-level signal state (see curve 508), and control the synchronous rectifier MOSFET Q2 to turn on for the second time. The output voltage signal of the secondary control circuit then drops to the low-level state at the third moment (t3) (see curve 508) after the synchronous rectifier MOSFET Q2 is turned on for the second time. The time interval between the second moment and the third moment, i.e., the interval of t2-t3, is used as the secondary on-time. In other words, t2 is the starting time when the synchronous rectifier MOSFET Q2 is turned on for the second time, and t3 is the end of the secondary on-time of the synchronous rectifier MOSFET Q2. The secondary on-time, mapped to the third PWM diagram (i.e., the waveform of DRISR), corresponds to a PWM pulse 510, which is after the pit that is present after the synchronous rectifier MOSFET Q2 is abnormally turned off. The PWM pulse 510 drives Q2 to turn on for the second time.

The first waveform diagram in FIG. 5 has a vertical axis representing $$V_0 \cdot \frac{N_a}{N_S},$$

where $N_a$ is the number of turns of the primary winding of the transformer in FIG. 2, $N_S$ is the number of turns of the secondary winding of the transformer T1 in FIG. 2. Vo is the output voltage $V_{OUT}$ of the switching power supply. In FIG. 5, curve 502 represents the feedback signal in case 1, curve 504 represents the feedback signal in case 2, curve 506 represents the voltage VDET in case 1, and curve 508 represents the voltage VDET in case 2.

Correspondingly, in an embodiment, in a primary detection circuit, a process for determining the change of the feedback signal at the primary control circuit includes: the primary detection circuit is configured to detect a moment when the feedback signal (voltage VFB) drops to be lower than a reference value, and, obtain the relationship between the present feedback signal and the reference value within a specified time starting from this moment, to determine the change of the present feedback signal.

Referring to the first waveform diagram of the feedback signal VFB at the primary control circuit in FIG. 5, starting from the moment when detecting that the feedback signal decreases to be below the reference value, the relationship between the present feedback signal and the reference value may be obtained within the specified time to determine whether the feedback signal has changed.

Specifically, the relationship between the present feedback signal and the reference value may be monitored in real time. The specific relationship is not limited. For example, if the present feedback signal is lower than the reference value all the time, then the present feedback signal has no change. If the present feedback signal changes again toward the high-level and exceeds the reference value, this means that a higher level signal appears during the secondary on-time corresponding to the present delayed turn-off, which indicates that the secondary control circuit transmits the encoded information to the primary control circuit. The reference value in the example of FIG. 5 is zero (0), or the reference value may take other values. In this embodiment, the reference value is set to 0 so that the changes of the waveform can be visually seen.

In an embodiment, the primary control circuit decoding the encoded information based on the change of the feedback signal may include: when the present feedback signal obtained by the primary control circuit within the specified time exceeds the reference value again, the primary control circuit decodes the encoded information sent by the secondary control circuit to obtain a first level signal; when the present feedback signal obtained by the primary control circuit within the specified time does not exceed the reference value again, the primary control circuit decodes the encoded information sent by the secondary control circuit to obtain a second level signal.

Specifically, when the primary control circuit detects within the specified time that the present feedback signal exceeds the reference value again, it decodes the encoded information sent by the secondary control circuit to obtain the first level signal; when the primary control circuit does not detect within the specified time that the present feedback signal exceeds the reference value again, it decodes the encoded information sent by the secondary control circuit to obtain the second level signal.

For example, timing may start at time t1 when the secondary chip detects that Vdet (or VDET) changes from the negative to the positive. After an interval of T1 (T1=t2−t1), i.e., at t2, the on-time of 200 ns (about 35 ns under high voltage) starts and then ends at t3. Taking the primary chip as an example, t1 is the moment when the feedback signal VFB starts decreasing from a high level (see curve 502), t2 is the moment when the feedback signal VFB intersects with the rise of the voltage VDET (see curve 502), and t3 is the moment when the feedback signal VFB rises to reach the peak after the delayed turn-off (see curve 504).

According to an embodiment operation logic of the primary control chip, the primary control chip may detect, within a specified time starting from the moment when the feedback signal decreases from a high level to be lower than a feedback signal threshold, whether the voltage of the feedback signal may go up to exceed the feedback signal threshold again. If the voltage of the feedback signal exceeds the feedback signal threshold again, it indicates that the secondary side sends a logic high level signal to the primary side. If the voltage of the feedback signal does not exceed the feedback signal threshold again, it indicates that the secondary side sends a logic low level signal to the primary side.

It should be noted that a calculation formula for the specified time T2 may be:

$$T_2 = \pi \cdot \sqrt{L_p \cdot C_{oss}}$$

where $L_p$ is the inductance value of the primary winding Np, and $C_{oss}$ is the capacitance value of the parasitic capacitor of the secondary synchronous rectifier MOSFET.

In an embodiment, the specified time may be changed by utilizing the multiplexed PINs of the secondary control circuit and the primary control circuit, respectively, and changing resistance value of resistors connected to multiplexed PINs to determine the specified time. There is a mapping relationship between a resistance change of a resistor connected to a PIN and a change of the specified time.

Specifically, by utilizing the multiplexed PINs set at the secondary control circuit and the primary control circuit, respectively, the resistance value of a resistor connected to a corresponding multiplexed PIN may be changed, so as to change the specified time. Referring to FIG. 2, the resistance value of a resistor, e.g., R26 in FIG. 2, of the pin VDET may be used to change the time $T_2$ in order to adapt to different systems. In an embodiment, to utilize the resistance change to change time, a function mapping relationship may be established between the resistance change and the length of the change of the specified time in chips of the respective control circuits. This embodiment does not limit the type of the function mapping relationship. For example, an existing function relationship may be used according to the actual situation, or a specific function relationship may be constructed.

In addition, regarding the changes of the specified time, in an embodiment, the secondary control circuit may also include a voltage detection circuit. The voltage detection circuit may be configured to detect a value of the current through the PIN VCC of the secondary control circuit, to obtain the corresponding voltage change, where the voltage change represents the resistance change.

Specifically, the value of the current through the PIN VCC of the secondary control circuit may be changed, and the current may be used to charge a fixed capacitor to obtain different voltage values, achieving changing the voltage value. This change of the voltage value can represent the change of the resistance value.

Embodiments of the present disclosure determine the change of the feedback signal based on the change corresponding to the secondary on-time, which improves the detection flexibility and accuracy.

FIG. 6 is a flowchart of an example method 600 of controlling a switching power supply according to embodiments of the present disclosure. As shown in FIG. 6, the method 600 is applied to the switching power supply, and the switching power supply is used to supply power to a load device. The switching power supply includes a secondary control circuit and a primary control circuit, and the secondary control circuit is coupled to the secondary side of a transformer of the switching power supply. The method 600 includes the following steps.

S11: Control the secondary control circuit to receive a power request signal of the load device, and encode the power request signal to generate encoded information.

S12: Control the primary control circuit to receive, using the transformer, a feedback signal that reflects an output voltage of the switching power supply, decode the encoded information based on a change of the feedback signal, and control the switching power supply to match the power supply need of the load device.

Specifically, the secondary control circuit receives the power request signal of the load device, and encodes the power request signal to generate the encoded information. The encoding algorithm is not limited here and may be selected according to the actual situation. The primary control circuit is controlled to use the transformer to receive the feedback signal that reflects the output voltage of the switching power supply. The encoded information is decoded based only on the change of the feedback signal, so that the switching power supply may be controlled to match the power supply need of the load device.

Embodiments of the present disclosure provide the method for controlling the switching power supply. The switching power supply is used to supply power to the load device, and includes the secondary control circuit and the primary control circuit. The secondary control circuit is coupled to the secondary side of the transformer of the switching power supply. The secondary control circuit is controlled to receive the power request signal of the load device, and encode the power request signal to generate the encoded information. The primary control circuit is controlled to receive, using the transformer, the feedback signal that reflects the output voltage of the switching power supply, and decode the encoded information based on the change of the feedback signal. The switching power supply is controlled to match the power supply needs of the load device. The control method of the switching power supply realizes transmission through the transformer without the need of using an optocoupler device for transmission, avoiding the primary control chip from receiving invalid or incomplete request information, which is caused by drifting of the parameters of the optocoupler device due to change of signal processing circuits, processes or environmental. This improves the code transmission success rate of the primary control circuit and reduces the cost of the entire system. At the same time, at the primary control circuit, the transformer is used to receive the feedback signal, and the encoded information is decoded only through changes of the feedback signal in order to match the power supply needs of the load device, which simplifies the decoding operation.

Based on the above embodiments, in an embodiment, the determination of the change of the feedback signal includes: receiving, by use of the transformer, a width value of the feedback signal in the present control cycle corresponding to the secondary control circuit during on-time; obtaining a width value of a feedback signal in the previous control cycle, where the width value of the feedback signal in the previous control cycle is stored in the primary control circuit; based on the relationship between a threshold value and a difference of the width values of the feedback signal in the present control cycle and the previous control cycle, determining the change of the feedback signal. That is, based on the threshold and the difference between the width value of the present feedback signal and the width value of the previous feedback signal, the change between the present feedback signal and the previous feedback signal is determined.

In an embodiment, decoding the encoded information based on the change of the feedback signal includes: when the obtained difference is greater than the threshold, decoding the encoded information sent by the secondary control circuit to obtain a first level signal; when the obtained difference is less than or equal to the threshold, decoding the encoded information sent by the secondary control circuit to obtain a second level signal.

In an embodiment, a process for determining the change of the (present) feedback signal includes: receiving, using the transformer, a width value of a feedback signal that is in the present control cycle and that corresponds to the secondary control circuit during on-time; obtaining a width value of the feedback signal in the previous control cycle, primary currents of the present control cycle and the previous control cycle, where the width value of the feedback signal in the previous control cycle is stored in the primary control circuit; and determining the change of the feedback signal based on a relationship between a ratio of the width of the feedback signal and the primary current in the present control cycle and a ratio of the width of the feedback signal and the primary current in the previous control cycle. That is, the change of the present feedback signal is determined based on a first ratio of the width value of present feedback signal and the primary current in the present control cycle, and a second ratio of the width value of previous feedback signal and the primary current in the previous control cycle. The first ratio may be referred to as a ratio corresponding to the present control cycle, and the second ratio may be referred to as a ratio corresponding to the previous control cycle. The first ratio and the second ratio may utilize ratio 1 or ratio 2, as discussed above.

In an embodiment, when ratio 2 is used, decoding the encoded information based on the change of the feedback signal includes: when the obtained ratio corresponding to the present control cycle is smaller than the ratio corresponding to the previous control cycle, decoding the encoded information sent by the secondary control circuit to obtain a first level signal; and when the obtained ratio corresponding to the present control cycle is equal to the ratio corresponding to the previous control cycle, decoding the encoded information sent by the secondary control circuit to obtain a second level signal.

In an embodiment, the secondary control circuit includes a synchronous rectifier MOSFET, and a process for determining the encoded information includes: when receiving the power request signal of the load device, controlling to delay turning off the synchronous rectifier MOSFET by a preset time, and encoding the power request signal to obtain the encoded information.

In an embodiment, the secondary control circuit includes a synchronous rectifier MOSFET, and a process for determining the encoded information includes: when receiving the power request signal of the load device, controlling to turn off the synchronous rectifier MOSFET, and encoding the power request signal to obtain the encoded information during the secondary on-time after the synchronous rectifier MOSFET is turned off.

In an embodiment, the secondary control circuit includes a secondary detection circuit, and a process for determining the secondary on-time of the synchronous rectifier MOSFET includes: detecting a first moment when the output voltage signal of the secondary control circuit starts changing from a low-level signal state, at a second moment when the output voltage signal of the secondary control circuit increases to reach a high-level signal state, starting timing and controlling the synchronous rectifier MOSFET to turn on for a second time, and detecting a third moment when the output voltage signal of the secondary control circuit drops to reach a low-level state after the synchronous rectifier MOSFET is turned on for the second time, where the time interval between the second moment and the third moment is used as the secondary on-time.

In an embodiment, the primary control circuit includes a primary detection circuit, and a process for determining the change of the feedback signal includes: starting from a moment when detecting that the feedback signal drops and is lower than a reference value, obtaining a relationship between the present feedback signal and the reference value within a specified time to determine the change of the present feedback signal.

In an embodiment, decoding the encoded information based on the change of the feedback signal includes: when detecting, within the specified time, that the present feedback signal exceeds the reference value again, encoding the encoded information sent by the secondary control circuit to obtain the first level signal; and when detecting, within the specified time, that the present feedback signal does not exceed the reference value again, encoding the encoded information sent by the secondary control circuit to obtain the second level signal.

In an embodiment, the specified time is determined by using multiplexed PINS corresponding to the secondary control circuit and the primary control circuit, and by changing resistance values of resistors connected to the multiplexed PINs, where there is a mapping relationship between resistance changes of the resistors connected to the multiplexed PINs and changes of the specified time.

In an embodiment, the secondary control circuit also includes a voltage detection circuit. The voltage detection circuit is configured to obtain the change of a corresponding voltage by detecting a current through the VCC PIN of the secondary control circuit, where the change of the voltage value indicates the resistance change of a resistor.

The method of controlling the switching power supply in the above embodiments corresponds to the above embodiments of the switching power supply, and details will not be repeated here. Reference may be made to the above corresponding embodiments.

In an embodiment, after using the transformer to receive the feedback signal, the method may further include: presetting a start bit and a stop check bit corresponding to the encoded information; and decoding the encoded information to obtain decoded information based on the change of the feedback signal, the start bit and the stop check bit.

Specifically, in order to improve the accuracy of the received encoded information, the entire encoded information may be preset with multiple bits of the start bit and the stop check bit, to prepare for the decoding at the primary side. By setting the special start bit and stop check bit, the encoded information is decoded at the primary control circuit under normal working conditions, based on the change of the feedback signal, the start bit and the stop check bit, to obtain the decoded information, that is, a data packet including the special start bit and stop check bit. Thus, the encoded information that the secondary control circuit wants to send to the primary control circuit is parsed out, and the voltage and current may then be adjusted accordingly.

In some embodiments, in a present control cycle, the secondary control circuit receives a power request signal of a load device of the switching power supply, where the power request signal requests power to be supplied to the load device from the switching power supply. The power request signal may carry information indicating power that is demanded/requested by the load device. As an example, different levels of power may be pre-set, which indicate powers that load devices may request. Each level of power may correspond to a codeword, e.g., 10101010. The codeword includes a number of bits/codes, which is either 0 or 1. The number of codes is configurable. In this example, the codeword has 8 bits/codes. The correspondence between the levels of power and the codewords are also configurable. A level of power may include voltage, current, or a combination thereof. The power request signal may carry information about the codeword, i.e., power demanded. The secondary control circuit, when receiving the power request signal, may encode the power request signal including the power information, e.g., a codeword corresponding to power demanded by the load device, and send the encoded information to the primary side. The primary side may decode the encoded information to obtain the codeword (representing the power demanded), based on which, the primary side controls to match the power demanded by the load device, i.e., to supply corresponding power to the load device according to the demanded power.

When receiving the power request signal, the secondary control circuit may encode the power request signal to generate the encoded information, e.g., by delaying turning off the secondary control circuit to encode the code 1 (increasing the on-time), and by keeping the normal on-time of the secondary control circuit to encode the code 0 (not increasing the on-time). As an example, the secondary control circuit may encode the power request signal by delaying turning off a synchronous rectifier MOSFET of the secondary control circuit by a preset time. The delayed turn-off of the synchronous rectifier MOSFET causes the feedback signal received at the primary control circuit in the present control cycle to have an increased signal width with the increase greater than a threshold, based on which, the primary control circuit knows that the secondary side sends a high level signal, e.g., 1, to the primary side. When the increase is not greater than the threshold, the primary control circuit knows that the secondary side sends a low level signal, e.g., 0, to the primary side.

In the present control cycle, the primary control circuit may monitor the feedback signal, detect a change of the feedback signal (e.g., width change or voltage change as described above), and perform decoding based on the change of the feedback signal, to generate encoded information, e.g., the first level signal (a high level signal 1 for example), or the second level signal (a low level signal 0 for example). Taking the codeword 10101010 as an example, i.e., the power request signal includes this 8-bit/code codeword requesting a corresponding power supply, the secondary control circuit may send the 8 bits/codes in the codeword 10101010 in sequence to the primary side in eight continuous control cycles, where each code of the 8 codes is sent in a corresponding control cycle by encoding the corresponding code. As an example, for a code that is 1, the secondary control circuit may delay turning off in a corresponding control cycle to cause the width of the feedback signal to increase, so that the primary side may decode to get 1 in the corresponding control cycle; and for a code that is o, the secondary control circuit may keep the width of the feedback signal same as that in the normal operating condition in a corresponding control cycle, so that the primary side may decode to get 0 in the corresponding control cycle. The primary side decodes the encoded information in the control cycles and obtains the codeword 10101010, which corresponds to a level of power, and may then matches the power demand of the load device based on the obtained codeword 10101010. In some embodiments, the secondary control circuit may signal, to the primary control circuit, the start of transmission of the encoded codeword 10101010, such that the primary side may start decoding (start monitoring the feedback signal) accordingly in order to correctly decode the encoded information. For example, when the secondary control circuit receives a power request signal in a control cycle, the secondary control circuit may signal the primary control circuit to start decoding in the next control cycle for 8 cycles. Other applicable methods for signaling the starting and ending of decoding by the primary control circuit may also be used. If, as an example, the codeword obtained by the primary side does not correspond to any pre-set level of power, which may occur, e.g., when decoding at the primary side is not successful or in error, the primary side may not respond to the power request signal from the load device.

The switching power supply and the control method of the switching power supply provided by the embodiments of the present disclosure have been described above in detail. Each embodiment in the specification is described in a progressive manner. Each embodiment is described with an emphasis on its difference from other embodiments. The same or similar parts in the various embodiments may be referred to each other. For a device disclosed in the embodiments, the corresponding description provided is relatively simple since the device corresponds to the method(s) disclosed in the embodiments. For relevant details, reference may be made to the description in the embodiment methods. It should be noted that those of ordinary skill in the art may make modifications and alterations to the present disclosure without departing from the principles of the present disclosure, and these modifications and alterations also fall within the protection scope of the claims of the present disclosure.

It should also be noted that in this disclosure, relational terms such as first and second are only used to distinguish one entity or operation from another entity or operation, and do not necessarily require or imply that any actual relationship or order exists between these entities or operations. Further, the term "include", "comprise" or any other variations thereof is intended to cover a non-exclusive inclusion, such that a process, method, article, or device including a set of elements not only includes those elements, but also includes other elements not expressly listed, or also includes elements inherent in such a process, method, article, or device. Without further limitations, an element defined by the phrase "include a . . . " does not exclude the presence of additional identical elements in a process, method, article or device including said element.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A switching power supply, comprising:
a secondary control circuit coupled to a secondary side of a transformer of the switching power supply, the secondary control circuit being configured to receive a power request signal of a load device, and encode the power request signal to generate encoded information; and
a primary control circuit coupled to a primary side of the transformer, the primary control circuit being configured to: receive, by use of the transformer, a feedback signal reflecting an output voltage of the switching power supply, decode the encoded information based on a change of the feedback signal that is represented by a parameter of the feedback signal with respect to a threshold, and based thereon, control the switching power supply to supply power to the load device.

2. The switching power supply of claim 1, wherein the parameter is a width of the feedback signal, and
the primary control circuit is further configured to determine the change of the feedback signal based on a difference between a first width value of the feedback signal in a present control cycle of the switching power supply and a second width value of the feedback signal in a previous control cycle of the switching power supply.

3. The switching power supply of claim 2, wherein decoding the encoded information comprises:
when the difference is greater than the threshold, decoding the encoded information sent by the secondary control circuit to obtain a first signal; and when the difference is less than or equal to the threshold, decoding the encoded information sent by the secondary control circuit to obtain a second signal.

4. The switching power supply of claim 1, wherein the secondary control circuit includes a synchronous rectifier metal-oxide-semiconductor field-effect transistor (MOSFET), and the secondary control circuit is further configured to:

when receiving the power request signal of the load device, control to delay turning off the synchronous rectifier MOSFET by a preset time to change the parameter of the feedback signal, to encode the power request signal to obtain the encoded information.

5. The switching power supply of claim 1, wherein the secondary control circuit includes a synchronous rectifier MOSFET, and the secondary control circuit is further configured to:

encode the power request signal to obtain the encoded information by use of a secondary on-time of the synchronous rectifier MOSFET after the synchronous rectifier MOSFET is turned off in a present control cycle of the switching power supply.

6. The switching power supply of claim 5, wherein the secondary control circuit is further configured to:

at a first moment when an output voltage signal of the secondary control circuit rises from a low-level signal to reach a high-level signal, control the synchronous rectifier MOSFET to turn on for a second time;

detect a second moment when the output voltage signal of the secondary control circuit drops to reach the low-level signal after the synchronous rectifier MOSFET is turned on for the second time; and determine a time interval between the first moment and the second moment as the secondary on-time.

7. The switching power supply of claim 5, wherein the primary control circuit is further configured to:

starting from a moment when detecting that the feedback signal drops to be lower than a reference value, determine a relationship between the feedback signal and the reference value within a specified time to determine the change of the feedback signal, wherein the reference value is the threshold.

8. The switching power supply of claim 7, wherein decoding the encoded information comprises:

when detecting, within the specified time, that the feedback signal exceeds the reference value again, decoding the encoded information sent by the secondary control circuit to obtain a first signal; and when detecting, within the specified time, that the feedback signal does not exceed the reference value again, decoding the encoded information sent by the secondary control circuit to obtain a second signal.

9. The switching power supply of claim 8, wherein the secondary control circuit and the primary control circuit each is further configured to:

determine the specified time by changing a resistance value of a resistor connected to a multiplexed pin, with changes of the resistance value mapping to changes of the specified time.

10. The switching power supply of claim 9, wherein the multiplexed pin is a VCC pin of the secondary control circuit, and the secondary control circuit is further configured to detect a current through the VCC pin, and obtain a change of a voltage corresponding to the current, the change of the voltage indicating a resistance change of the resistor connected to the VCC pin.

11. A method, comprising:

receiving, at a secondary control circuit of a switching power supply, a power request signal of a load device of the switching power supply, the switching power supply comprising the secondary control circuit and a primary control circuit that are coupled, respectively, to a secondary side and a primary side of a transformer of the switching power supply;

encoding, at the secondary control circuit, the power request signal to generate encoded information;

receiving, at the primary control circuit using the transformer, a feedback signal that reflects an output voltage of the switching power supply;

decoding, at the primary control circuit, the encoded information based on a change of the feedback signal that is represented by a parameter of the feedback signal with respect to a threshold; and supplying, by the switching power supply, power to the load device based on the decoding.

12. The method of claim 11, further comprising:

determining, at the primary control circuit, the change of the feedback signal based on a difference between a first width value of the feedback signal in a present control cycle of the switching power supply and a second width value of the feedback signal in a previous control cycle of the switching power supply, wherein the parameter is a width of the feedback signal.

13. The method of claim 12, wherein decoding the encoded information comprises:

when the difference is greater than the threshold, decoding the encoded information sent by the secondary control circuit to obtain a first signal; and when the difference is less than or equal to the threshold, decoding the encoded information sent by the secondary control circuit to obtain a second signal.

14. The method of claim 11, wherein encoding the power request signal comprises:

when receiving the power request signal of the load device, delaying turning off a synchronous rectifier MOSFET of the secondary control circuit by a preset time to change the parameter of the feedback signal, to encode the power request signal to obtain the encoded information.

15. The method of claim 11, wherein encoding the power request signal comprises:

encoding the power request signal to obtain the encoded information by use of a secondary on-time of a synchronous rectifier MOSFET of the secondary control circuit after the synchronous rectifier MOSFET is turned off in a present control cycle of the switching power supply.

16. The method of claim 15, further comprising:

at a first moment when an output voltage signal of the secondary control circuit rises from a low-level signal to reach a high-level signal, controlling the synchronous rectifier MOSFET to turn on for a second time;

detecting a second moment when the output voltage signal of the secondary control circuit drops to the low-level signal after the synchronous rectifier MOSFET is turned on for a second time; and determining a time interval between the first moment and the second moment as the secondary on-time.

17. The method of claim 16, further comprising:

starting from a moment when detecting that the feedback signal drops to be lower than a reference value, determining a relationship between the feedback signal and the reference value within a specified time to determine the change of the feedback signal, wherein the reference value is the threshold.

18. The method of claim 17, wherein decoding the encoded information comprises:

when detecting, within the specified time, that the feedback signal exceeds the reference value again, decoding the encoded information sent by the secondary control circuit to obtain a first signal; and when detecting, within the specified time, that the feedback signal does not exceed the reference value again, decoding the encoded information sent by the secondary control circuit to obtain a second signal.

19. The method of claim 18, further comprising:

determining the specified time by changing, at each of the secondary control circuit and the primary control circuit, a resistance value of a resistor connected to a multiplexed pin, with changes of the resistance value mapping to changes of the specified time.

20. The method of claim 19, further comprising:

detecting a current through a VCC pin of the secondary control circuit; and obtaining a change of a voltage corresponding to the current, the change of the voltage indicating a resistance change of the resistor connected to the VCC pin.

21. The method of claim 11, further comprising:

after receiving the feedback signal, presetting, at the primary control circuit, a start bit and a stop check bit corresponding to the encoded information; and wherein decoding the encoded information comprises:

decoding, at the primary control circuit, the encoded information to obtain decoded information based on the change of the feedback signal, the start bit and the stop check bit.

22. A switching power supply, comprising:

a secondary control circuit coupled to a secondary winding of a transformer of the switching power supply, the secondary control circuit comprising a synchronous rectifier switch connected to the secondary winding, and the secondary control circuit being configured to: receive a power request signal from a load device, and encode the power request signal to generate encoded information by controlling an on-time of the synchronous rectifier switch; and a primary control circuit coupled to a primary winding and an auxiliary winding of the transformer, the primary control circuit being configured to: receive, by use of the transformer, a feedback signal related to an output voltage of the switching power supply, decode the encoded information based on a parameter of the feedback signal and a threshold to obtain decoded information, and determine to supply power to the load device based on the decoded information.

23. The switching power supply of claim 22, wherein decoding the encoded information comprises:

when the parameter of the feedback signal is greater than the threshold, decoding the encoded information sent by the secondary control circuit to obtain a first signal; and when the parameter of the feedback signal is less than or equal to the threshold, decoding the encoded information sent by the secondary control circuit to obtain a second signal.

* * * * *